(12) United States Patent
Desgranges et al.

(10) Patent No.: US 10,576,444 B2
(45) Date of Patent: Mar. 3, 2020

(54) LOADING A CATALYST INTO A BUBBLE COLUMN FOR FISCHER-TOPSCH SYNTHESIS

(71) Applicant: IFP Energies nouvelles, Rueil-Malmaison (FR)

(72) Inventors: Regis Desgranges, Bourgoin Jallieu (FR); Jean-Philippe Heraud, Saint Pierre de Chandieu (FR); Jean-Christophe Viguie, Lyons (FR); Sebastien Boucher, Chatou (FR); Chiara Della Torre, Milan (IT); Elsa Mignone, Monza (IT)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 16/060,117

(22) PCT Filed: Nov. 8, 2016

(86) PCT No.: PCT/EP2016/076938
§ 371 (c)(1),
(2) Date: Jun. 7, 2018

(87) PCT Pub. No.: WO2017/097525
PCT Pub. Date: Jun. 15, 2017

(65) Prior Publication Data
US 2018/0369776 A1 Dec. 27, 2018

(30) Foreign Application Priority Data
Dec. 8, 2015 (FR) ........................ 1562031

(51) Int. Cl.
*B01J 8/22* (2006.01)
*C10G 2/00* (2006.01)
*B01J 8/18* (2006.01)

(52) U.S. Cl.
CPC ............ *B01J 8/228* (2013.01); *B01J 8/1836* (2013.01); *C10G 2/30* (2013.01); *C10G 2/344* (2013.01); *B01J 2208/00132* (2013.01); *B01J 2208/00646* (2013.01); *B01J 2208/00716* (2013.01); *B01J 2208/00752* (2013.01); *B01J 2208/00787* (2013.01)

(58) Field of Classification Search
None
See application file for complete search history.

(56) References Cited

U.S. PATENT DOCUMENTS

| 6,075,062 A * | 6/2000 | Zennaro ............... B01J 23/8476 518/715 |
| 9,290,699 B2 | 3/2016 | Heraud |
| 2007/0066690 A1 * | 3/2007 | Maretto .................. C10G 2/33 518/726 |

FOREIGN PATENT DOCUMENTS

| EP | 2194111 A1 | 6/2010 |
| FR | 2991991 A1 | 12/2013 |
| WO | 2002059232 A2 | 8/2002 |
| WO | 2003068715 A1 | 8/2003 |
| WO | 2005026293 A1 | 3/2005 |

OTHER PUBLICATIONS

International Search Report PCT/EP2016/076938 dated Jan. 24, 2017.
Pendyala Venkat Ramana et al: "Fischer-Tropsch Synthesis: Effect of Start-Up Solvent in a Slurry Reactor", Catalysis Letters, Springer New York LLC, United States, vol. 143, No. 5, Mar. 15, 2013 (Mar. 15, 2013), pp. 395-400, XP035372713, ISSN: 1011-372X.

* cited by examiner

*Primary Examiner* — Medhanit W Bahta
(74) *Attorney, Agent, or Firm* — Millen, White, Zelano and Branigan, P.C.

(57) ABSTRACT

A method for charging a catalyst into a reactor (40) comprising a separation loop (21), comprising the following steps:
a) filling the reactor (40) with a solvent S1;
b) filling the separation loop (21) with said solvent S1;
c) causing said solvent S1 to move in the synthesis reactor (40) and the separation loop (21);
d) heating the reactor (40) to a temperature of 100° C. or less;
e) injecting an inert gas into the bottom of the reactor (40);
f) mixing said catalyst with a solvent S2 in a vessel (30) in order to obtain a liquid/solid mixture;
g) increasing the pressure in the vessel (30) then sending the liquid/solid mixture to the reactor (40);
h) withdrawing said solvent S1 and/or S2.

12 Claims, 1 Drawing Sheet

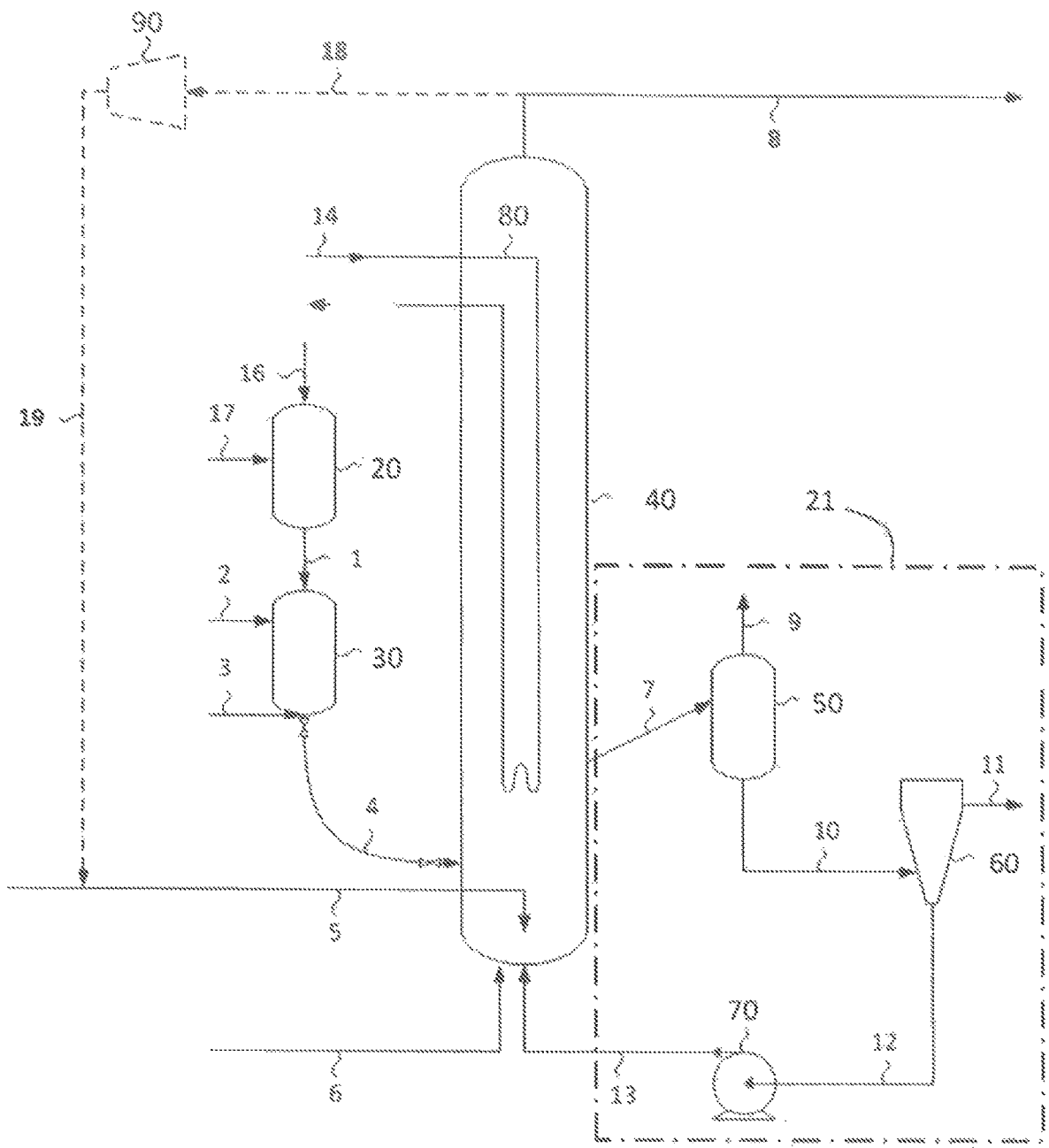

LOADING A CATALYST INTO A BUBBLE COLUMN FOR FISCHER-TOPSCH SYNTHESIS

TECHNICAL FIELD

The present invention relates to the field of Fischer-Tropsch synthesis processes, and in particular to charging a catalyst into a bubble column for Fischer-Tropsch synthesis.

PRIOR ART

Fischer-Tropsch synthesis processes can be used to obtain a wide range of hydrocarbon cuts from a mixture of CO+$H_2$, generally known as synthesis gas. The overall equation for the Fischer-Tropsch synthesis can be written as follows:

$$nCO+(2n+1)H_2 \rightarrow C_nH_{2n+2}+nH_2O$$

The Fischer-Tropsch reaction is typically carried out between 1 and 4 MPa, at a temperature which is generally in the range 200° C. to 350° C. The Fischer-Tropsch synthesis is at the heart of processes for the conversion of natural gas, coal or biomass into fuels or intermediates for the chemicals industry. These processes are known as GTL ("Gas to Liquids") when natural gas is used as the initial feed, CTL ("Coal to Liquids") for coal, and BTL ("Biomass to Liquids") for biomass.

In the case of CTL and BTL processes, the initial feed is firstly gasified into synthesis gas, a mixture of carbon monoxide and dihydrogen. In the case of GTL processes, methane is converted into synthesis gas, usually in autothermal reforming equipment. The synthesis gas is then transformed mainly into paraffins by means of the Fischer-Tropsch synthesis, and these paraffins may then be transformed into fuels by a hydroisomerization-hydrocracking process. As an example, transformation processes such as hydrocracking, dewaxing, and hydroisomerization of these paraffins can be used to produce different types of fuels in the middle distillates range: kerosene (150-250° C. cut) and gas oil (250-370° C. cut). The lighter C5-C15 fractions can be distilled and used as solvents or as a feed in certain petrochemicals applications.

The Fischer-Tropsch synthesis reaction may be carried out in various types of reactors (fixed bed, moving bed (also known as fluidized bed) or three-phase (gas, liquid, solid), or in a bubble column), and the reaction products have the notable characteristic of being free from sulphur-containing, nitrogen-containing or aromatic type compounds.

In one implementation in a bubble column type reactor (or "slurry bubble column", or in fact "slurry" for simplification), the catalyst is characteristically divided into a very fine powdery state, typically of the order of a few tens of micrometres, this powder forming a suspension with the reaction medium.

When using a catalyst in Fischer-Tropsch synthesis processes of the "slurry" type as defined above, the catalyst is subjected to particularly severe conditions in terms of mechanical and chemical stress which could damage the catalyst and thus alter its catalytic performances, in particular its activity.

Furthermore, the catalyst could also be damaged upstream of where it is used, and more particularly during the phase for charging the catalyst into the reactor, as well as during the reactor start-up phase. In fact, in the context of Fischer-Tropsch synthesis, the catalyst has to be in the reduced form in order to be catalytically active; thus, less than optimal charging of the catalyst into the synthesis reactor could cause it to oxidize at least partially, which would have the inevitable result of reducing its activity.

The document US 2007/254968 discloses a method for charging a Fischer-Tropsch catalyst into a synthesis reactor which can be used to reduce damage to it during the charging phase. Before being inserted into the synthesis reactor, the catalyst is initially mixed with a liquid in order to form a solid/liquid mixture in a storage unit, the mixture then being sent to the synthesis reactor by means of a pump. However, using a pump when transferring catalyst from the storage unit to the synthesis reactor could irreversibly damage the catalyst through mechanical destruction. Furthermore, the pump itself might be damaged by mechanical abrasion during transfer of the catalyst. Finally, the absence of a pump limits the formation of fines, and therefore means that the yield of products obtained from the Fischer-Tropsch reaction can be increased.

The document U.S. Pat. No. 6,512,017 discloses a method for charging a Fischer-Tropsch catalyst into a synthesis reactor, in which the catalyst is protected during charging by a liquid wax. The liquid state of the wax means that the reactor has to be heated to a temperature above 150° C.

In that context, one aim of the present invention is to propose a method for charging a Fischer-Tropsch catalyst into a synthesis reactor in order to overcome the disadvantages discussed above. The method in accordance with the invention can be used to charge a Fischer-Tropsch catalyst into a synthesis reactor without the need for a pump, and thus can be used to limit the formation of catalyst fines while at the same time increasing the yield of products obtained from the Fischer-Tropsch synthesis. Furthermore, charging the catalyst into the synthesis reactor is carried out at a temperature which is lower than those described in the prior art, which means that a method which consumes far less energy can be obtained.

AIMS OF THE INVENTION

The present invention concerns a method for charging a catalyst into a synthesis reactor, of the bubble column type, comprising a separation loop, said method comprising the following steps:
a) filling at least a portion of the synthesis reactor with a solvent S1;
b) filling at least a portion of the separation loop of said synthesis reactor with said solvent S1;
c) causing said solvent S1 to move from the synthesis reactor to the separation loop and from the separation loop to the synthesis reactor;
d) heating the synthesis reactor to a temperature of 100° C. or less;
e) injecting an inert gas into the bottom of the synthesis reactor and increasing the pressure of the synthesis reactor in a manner such as to obtain an absolute pressure in the range 0.1 to 0.6 MPa;
f) mixing said catalyst with a solvent S2 in a vessel in order to obtain a liquid/solid mixture;
g) increasing the pressure in the vessel to a pressure which is at least 0.2 MPa higher than the pressure of the synthesis reactor, then sending the liquid/solid mixture obtained in step f) to the synthesis reactor;
h) withdrawing at least a portion of said solvent S1 and/or S2 contained in the synthesis reactor and/or in the separation loop.

Advantageously, the solvent S1 is identical to the solvent S2.

Preferably, the solvent S1 and/or the solvent S2 are selected from hydrogenated polyalphaolefin solvents or hydrogenated isoparaffinic solvents.

Advantageously, the method in accordance with the invention further comprises the following steps after step h):
i) heating the synthesis reactor to a temperature in the range 150° C. to 270° C.;
j) increasing the pressure of the synthesis reactor in a manner such as to obtain an absolute pressure in the range 1.0 to 6.0 MPa;
k) injecting synthesis gas into the bottom of the synthesis reactor, replacing the inert gas injected in step e).

Preferably, the separation loop comprises at least one degassing drum and a decanter.

Advantageously, at least a portion of said solvent S1 and/or S2 is withdrawn from step h) via the decanter.

Preferably, the inert gas injected in step e) is recovered from the head of the synthesis reactor then is recycled to the bottom of said synthesis reactor.

Advantageously, the catalyst is in the form of particles with a size in the range 10 to 500 micrometres.

Preferably, the quantity of solvent S2 used is determined in a manner such that a concentration of solid of more than 50% by weight in the vessel is not exceeded. Preferably, the catalyst of step f) is initially reduced in a reduction reactor.

Advantageously, the reduction step is carried out in the presence of a reducing gas at a pressure in the range 0 to 1.5 MPa, and at a final reduction temperature in the range 350° C. to 500° C.

Preferably, after the reduction step and before step f) of the method in accordance with the invention, the catalyst is cooled to a temperature of 80° C. or less.

Advantageously, the level to which the solvent S1 in step b) is filled into the degassing drum and/or into the decanter is at least 10% by volume with respect to the total volume of respectively the degassing drum and/or the decanter.

Preferably, in step d) the synthesis reactor is heated to a temperature of 80° C. or less.

BRIEF DESCRIPTION OF THE DRAWING

The FIGURE is a detailed representation of a method for charging a Fischer-Tropsch catalyst in accordance with the invention.

DETAILED DESCRIPTION OF THE INVENTION

The description below illustrates the various steps for charging a Fischer-Tropsch type catalyst into a synthesis reactor of the bubble column type.

In the drawing, said catalyst is charged into a synthesis reactor 40, and more particularly of the bubble column type.

The synthesis reactor 40, of the bubble column type, is initially empty, i.e. it does not contain catalyst before charging said catalyst into said synthesis reactor 40. Advantageously, the synthesis reactor 40 comprises a heat exchanger 80, for example a system of tubes, in order to cool the reaction medium, in particular during the Fischer-Tropsch type synthesis reaction which is exothermic. In the context of the method for charging catalyst into the synthesis reactor in accordance with the invention, the heat exchanger 80 is also used to heat the synthesis reactor 40 during the phase for charging the catalyst into the synthesis reactor 40 (see more particularly, step d) of the method in accordance with the invention in the context of charging the catalyst into the synthesis reactor).

In accordance with the invention, charging the catalyst into the synthesis reactor 40 comprises at least the following steps:
a) filling at least a portion of the synthesis reactor 40 with a solvent S1;
b) filling at least a portion of the separation loop 21 of said synthesis reactor 40 with said solvent S1;
c) causing said solvent S1 to move from the synthesis reactor 40 to the separation loop 21 and from the separation loop 21 to the synthesis reactor 40;
d) heating the synthesis reactor 40 to a temperature of 100° C. or less;
e) injecting an inert gas into the bottom of the synthesis reactor 40 and increasing the pressure of the synthesis reactor 40 in a manner such as to obtain an absolute pressure in the range 0.1 to 0.6 MPa;
f) mixing the catalyst with a solvent S2, which may be identical or different from the solvent S1, in a vessel 30 in order to obtain a liquid/solid mixture;
g) sending the solid/liquid mixture obtained in step f) to the synthesis reactor 40;
h) withdrawing at least a portion of the solvent S1 and/or S2 present in the synthesis reactor 40 and in the separation loop 21.

Advantageously, the method in accordance with the invention further comprises the following steps:
i) heating the synthesis reactor 40 to a temperature in the range 150° C. to 270° C.;
j) increasing the pressure of the synthesis reactor 40 in a manner such as to obtain an absolute pressure in the range 1.0 to 6.0 MPa;
k) injecting a synthesis gas to replace the inert gas.

The steps a) to k) will be described in detail below.
Step a)
In accordance with step a) of the method in accordance with the invention, at least a portion of the synthesis reactor 40 is filled with a solvent S1. The nature of the solvent S1 has to be selected so that it must be in the liquid state under normal temperature and pressure conditions, defined here by a temperature of 15° C. (298.15K) and a pressure of 101325 Pa, but also under the conditions of the Fischer-Tropsch synthesis (as will be described in the text below).

The solvent S1 is preferably free from any polluting elements, i.e. said solvent does not contain elements based on sulphur, nitrogen or halogenated compounds.

Advantageously, the solvent S1 is a hydrogenated polyalphaolefin solvent or a hydrogenated isoparaffinic solvent, such that it protects the catalyst, in the reduced form, from oxidation and thus can maintain the performances of the final catalyst.

The volume of solvent S1 injected into the synthesis reactor 40 is made to be such that the level of solvent S1 is above the level of the transfer line 7. Preferably, the volume of solvent S1 injected into the synthesis reactor 40 is made to be such that it reaches a level which is higher by at least 1% by volume, preferably 3% by volume and more preferably 5% by volume of the total volume of the synthesis reactor 40 with respect to the level of the outlet for the transfer line 7 of the synthesis reactor 40.

The solvent S1 is introduced into the synthesis reactor 40 via the line 6, at a temperature which is 80° C. or less, preferably 60° C. or less, and more preferably at ambient temperature, i.e. at 15° C.
Step b)
In accordance with step b) of the method in accordance with the invention, the separation loop 21 of the synthesis reactor 40 is filled with said solvent S1. In the context of the present invention, the separation loop 21 comprises at least one degassing drum 50, a decanter 60 and a pump 70.

The degassing drum 50 can be used to evacuate the surplus gas via the line 9; the decanter can be used to evacuate the surplus of solvents (S1 and/or S2) via the line 11.

The synthesis reactor 40 is connected to the degassing drum 50 via the transfer line 7; the degassing drum 50 is connected to the decanter 60 via the line 10; the decanter 60 is connected to the synthesis reactor 40 via the lines 12 and 13.

Advantageously, during the step for filling the separation loop 21, the volume of solvent injected into the degassing drum 50 and into the decanter 60 is at least 10% by volume, preferably 30% by volume, and more preferably 50% by volume with respect to the total volume respectively of said degassing drum 50 and of said decanter 60.

Step c)

In accordance with step c) of the method in accordance with the invention, the pump 70 of the separation loop 21 is started up in order to move the solvent S1 from the reactor 40 to the degasser 50, from the degasser 50 to the decanter 60, and from the decanter 60 to the synthesis reactor 40. Moving the solvent S1 in the synthesis reactor 40 and in the separation loop 21 means that the synthesis reactor can be started up, limiting the risk of clogging by sedimentation of the catalyst in the separation loop 21, and more particularly in the degassing drum 50 and the decanter 60, in the case of a problem with starting up the pump 70, and thus avoiding flushing the whole of the separation loop 21 with solvent S1 and/or S2 then with an inert gas, for example nitrogen.

Step d)

In accordance with step d) of the method in accordance with the invention, the synthesis reactor 40 is heated to a temperature of 100° C. or less, preferably 90° C. or less, more preferably 80° C. or less. In order to reach such a temperature, hot water and/or steam is injected into the line 14 of the heat exchanger 80.

Step e)

In accordance with step e) of the method in accordance with the invention, an inert gas is injected into the bottom of the synthesis reactor 40 via the line 5. Advantageously, the inert gas is nitrogen.

Preferably, the inert gas is injected through a gas distribution device (not shown in the FIGURE) which can be used to homogeneously distribute the gas over the entire section of the reactor 40. The flow rate for the inert gas is determined in a manner such that the velocity of the gas is higher than the speed at which the particles of catalyst fall in the synthesis reactor 40, said particles of catalyst being introduced into the synthesis reactor 40 in step g) of the method in accordance with the invention.

Furthermore, the pressure of the reactor 40 is increased in order to reach an absolute pressure in the range 0.1 to 0.6 MPa, preferably in the range 0.1 to 0.3 MPa.

In one embodiment, the inert gas is recovered via the evacuation conduit 8 for gas.

In another particular embodiment in accordance with the invention, the inert gas is recovered via the line 18 situated at the head of the synthesis reactor 40, then the inert gas is recycled to the bottom of said reactor 40 via the lines 19 and 5 by means of a compressor 90, in order to limit the consumption of said inert gas.

Step f)

In accordance with step f) of the method in accordance with the invention, a catalyst is mixed with a solvent S2 in a vessel 30 in order to obtain a solid/liquid mixture. The solvent S2 is supplied to the vessel 30 via the line 2. The catalyst is introduced into the vessel 30 via the line 1.

The solvent S2 is preferably free from any polluting elements, i.e. said solvent does not contain elements based on sulphur, nitrogen or halogenated compounds.

The solvent S2 is preferably identical to the solvent S1 used in the synthesis reactor 40 and in the separation loop 21. More particularly, the solvent S2 is a hydrogenated polyalphaolefin solvent or a hydrogenated isoparaffinic solvent. The solvent S2 can be used to protect the catalyst, which is in the reduced form, from oxidation, and thus to preserve its catalytic properties, in particular in terms of activity.

The quantity of solvent S2 used is determined in a manner such that a concentration of solid of more than 50% by weight in the vessel 30, preferably 40% by weight, and more preferably 30% by weight, is not exceeded.

In a manner analogous to the synthesis reactor 40, an inert gas is introduced into the bottom of the vessel 30 via the line 3 in order to allow the catalyst to be taken up into suspension and thus prevent any sedimentation of solid particles of the catalyst, which could result in clogging of the vessel 30.

In a preferred embodiment, the inert gas introduced via the line 3 is identical to the inert gas introduced via the line 5.

Step g)

In accordance with step g) of the method in accordance with the invention, the solid/liquid mixture obtained in step f) is transferred from the vessel 30 to the synthesis reactor 40.

In accordance with an essential aspect of the method in accordance with the invention, the pressure in the vessel 30 is increased by the inert gas supplied via the line 3, preferably nitrogen, to a pressure which is at least 0.2 MPa, preferably 0.4 MPa, and yet more preferably 0.6 MPa higher with respect to the pressure of the reactor. Hence, the transfer of the solid/liquid mixture is carried out via the line 4 by pressure difference between the vessel 30 and the synthesis reactor 40. The solid/liquid mixture which is thereby introduced into the synthesis reactor 40 comprising the catalyst in the form of solid particles is taken up into suspension because of the inert gas injected into the bottom of the synthesis reactor 40 via the line 5.

Step h)

In accordance with step h) of the method in accordance with the invention, at least a portion of the solvent S1 and/or S2 contained in the synthesis reactor and in the separation loop 21 is withdrawn. More particularly, the solvent S1 and/or S2 is withdrawn at the level of the decanter 60 via the line 11 in a manner such as to reduce the level of liquid in the synthesis reactor 40 to the initial liquid level (i.e. before injection of the solid/liquid mixture prepared in step f)).

Preferably, steps g) and h) are carried out simultaneously; thus, the solvent S1 and/or S2 is withdrawn at the level of the decanter 60 via the line 11 in a manner such as to reduce the level of liquid in the synthesis reactor 40 to the initial liquid level (i.e. before injection of the solid/liquid mixture prepared in step f)) during the transfer of the solid/liquid mixture from the capacity 30 to the synthesis reactor 40.

Advantageously, the solvent S1 and/or S2 is recycled (not shown in the FIGURE) to the method respectively via lines 6 and 2.

Advantageously, the steps f), g) and h) are repeated until a target quantity of catalyst has been charged into the synthesis reactor 40.

Advantageously, the method in accordance with the invention furthermore comprises the steps i), j) and k) below.

Step i)

In accordance with the optional step i) of the method in accordance with the invention, the synthesis reactor 40 is heated to the temperature of the Fischer-Tropsch synthesis reaction. In order to increase the temperature in the synthesis reactor 40, hot water and/or steam is injected into the line 14 of the heat exchanger 80 in a manner such as to reach the temperature at which the Fischer-Tropsch synthesis initiates, i.e. a temperature in the range 150° C. to 270° C., preferably in the range 170° C. to 250° C., and more preferably in the range 190° C. to 230° C.

Step j)

In accordance with the optional step j) of the method in accordance with the invention, the pressure of the synthesis reactor 40 is increased in a manner such as to reach the operating pressure of the Fischer-Tropsch synthesis reaction, i.e. an absolute pressure which is generally in the range 1.0 to 6.0 MPa, preferably in the range 1.5 to 4.0 MPa, and more preferably in the range 2.0 to 3.5 MPa. The flow rate of the inert gas injected via the line 5 is also increased gradually in a manner such as to maintain the same gas velocity as in step e).

Step k)

In accordance with the optional step k) of the method in accordance with the invention, a synthesis gas is injected via the line 5, replacing the inert gas. The flow rate of the synthesis gas is determined in a manner such as to obtain the target conversion of carbon monoxide. Advantageously, injecting synthesis gas at high temperature, i.e. a temperature of more than 180° C. and preferably more than 190° C., also protects against the formation of metal carbonyls which might be obtained from the reaction of the carbon monoxide of the synthesis gas with metals contained in the charge, and which are poisons for the Fischer-Tropsch catalyst.

Catalyst Reduction Step

Prior to using it in the synthesis reactor 40, the catalyst generally undergoes a reduction treatment, for example in pure or diluted hydrogen, at high temperature, with the intention of activating the catalyst and of forming particles of metal in a zero-valent state (in the metallic form). The reduction step may be carried out upstream of the vessel 30 in a reduction reactor 20.

Typically, a bed of catalyst precursor in the oxide form is formed in the reduction reactor 20 by supplying said reduction reactor 20 with a catalyst precursor via the line 16. Next, said catalyst precursor is brought into contact with a reducing gas, supplied via the line 17, by moving a stream of reducing gas over the bed of said catalyst precursor in a manner such as to reduce the metallic oxides. Preferably, the reducing gas is pure hydrogen.

The catalyst precursor is reduced at a pressure in the range 0 to 1.5 MPa and preferably in the range 0.3 to 1 MPa, and at a final reduction temperature in the range 350° C. to 500° C., and preferably in the range 400° C. to 450° C.

Preferably, after the reduction step, the catalyst is cooled to a temperature of 80° C. or less, preferably 60° C. or less, preferably in an inert atmosphere. Preferably, the gas used to cool the catalyst is identical to that used for the reduction step. The catalyst is then discharged from the reduction reactor 20 to the vessel 30 under gravity by means of the line 1.

Optionally, the catalyst cooling step is carried out in an intermediate vessel (not shown in the FIGURE) located between the reduction reactor 20 and the vessel 30.

Fischer-Tropsch Catalyst

In a non-limiting manner, the catalyst used in the context of the method in accordance with the invention comprises an active phase comprising at least one metal from group VIIIB, preferably selected from cobalt, nickel, ruthenium and iron deposited on a support. Preferably, the metal from group VIIIB is selected from iron and cobalt, and more preferably it is cobalt.

The active phase of said catalyst may advantageously further comprise at least one supplemental doping element selected from a noble metal from groups VIIB or VIIIB. The supplemental doping element can be used to improve the reducibility of the metal from group VIIIB, and thus its activity, or its selectivity, or in fact to slow down its deactivation. In the case in which the dopant is selected from a noble metal from groups VIIB or VIIIB, it is preferably selected from platinum (Pt), palladium (Pd), rhodium (Rh) or in fact rhenium (Re).

In a non-limiting manner, the support may be selected from supports composed of alumina, a mixture of silica and alumina, silica ($SiO_2$), titanium oxide ($TiO_2$) and zinc oxide (ZnO).

In a non-limiting manner, the catalyst may comprise one or more dopants, for example a compound selected from the following list: magnesium (Mg), copper (Cu), cobalt (Co), nickel (Ni), tin (Sn), zinc (Zn), phosphorus (P), boron (B), lithium (Li), calcium (Ca), caesium (Cs), sodium (Na), potassium (K), iron (Fe) and manganese (Mn).

Fischer-Tropsch Method

The Fischer-Tropsch method can be used for the production of essentially linear and saturated $C_5^+$ hydrocarbons. In the invention, the term "essentially linear and saturated $C_5^+$ hydrocarbons" means hydrocarbons in which the proportion of hydrocarbon compounds containing at least 5 carbon atoms per molecule represents at least 50% by weight, preferably at least 80% by weight of the entirety of the hydrocarbons formed, the total content of olefinic compounds present among said hydrocarbon compounds containing at least 5 carbon atoms per molecule being less than 15% by weight. The hydrocarbons produced by the method of the invention are thus essentially paraffinic hydrocarbons; the fraction thereof with the highest boiling points may be converted with a high yield into middle distillates (kerosene and gas oil cuts) using a catalytic hydroconversion process such as hydrocracking and/or hydroisomerization.

Preferably, the feed employed to carry out the method of the invention is constituted by synthesis gas which is a mixture of carbon monoxide and hydrogen with $H_2/CO$ molar ratios which may vary between 0.5 and 4.0 as a function of the production process from which it is obtained. The $H_2/CO$ molar ratio of synthesis gas is generally close to 3 when the synthesis gas is obtained from a process for the steam reforming of hydrocarbons or alcohol. The $H_2/CO$ molar ratio of synthesis gas is of the order of 1.5 to 2.0 when the synthesis gas is obtained from a partial oxidation process. The $H_2/CO$ molar ratio of synthesis gas is generally close to 2.5 when it is obtained from an autothermal reforming process. The $H_2/CO$ molar ratio of synthesis gas is generally close to 1 when it is obtained from a process for gasification and reforming of hydrocarbons with $CO_2$ (known as dry reforming).

The Fischer-Tropsch process in accordance with the invention is operated at a total pressure in the range 1.0 to 6.0 MPa, preferably in the range 1.5 to 4.0 MPa and more preferably in the range 2.0 to 3.5 MPa, at a temperature in the range 150° C. to 270° C., preferably in the range 170° C. to 250° C., and more preferably in the range 190° C. to 230° C. The hourly space velocity is advantageously in the range 100 to 20000 volumes of synthesis gas per volume of catalyst and per hour (100 to 20000 $h^{-1}$), and preferably in the range 400 to 10000 volumes of synthesis gas per volume of catalyst and per hour (400 to 10000 h$^{-1}$).

For this reason, the grain size of the catalyst used in the Fischer-Tropsch process may be in the range from a few microns to 2 millimetres. Typically, to operate in a three-phase "slurry" reactor (bubble column), the catalyst is finely divided and is in the form of particles. The particle size of the catalyst will be in the range 10 to 500 micrometres (μm), preferably in the range 10 to 300 μm and highly preferably in the range 20 to 150 μm, and yet more preferably in the range 20 to 120 μm.

The invention claimed is:

1. A method for charging a catalyst into a synthesis reactor (40), of the bubble column type, comprising a separation loop (21), said method comprising;
    a) filling at least a portion of the synthesis reactor (40) with a solvent S1;
    b) filling at least a portion of the separation loop (21) of said synthesis reactor(40) with said solvent S1;
    c) causing said solvent S1 to move from the synthesis reactor (40) to the separation loop (21) and from the separation loop to the synthesis reactor (40);
    d) heating the synthesis reactor (40) to a temperature of 100° C. or less;
    e) injecting an inert gas into the bottom of the synthesis reactor (40) and increasing the pressure of the synthesis reactor (40) in a manner such as to obtain an absolute pressure in the range 0.1 to 0.6 MPa;
    f) reducing the catalyst in a reduction reactor (20), and cooling to 80° C. or less, mixing said catalyst with a solvent S2 in a vessel (30) in order to obtain a liquid/solid mixture;
    g) increasing the pressure in the vessel (30) to a pressure Which is at least 0.2 MPa higher than the pressure of the synthesis reactor (40), that then sending the liquid/solid mixture obtained in step f) to the synthesis reactor 40;
    h) withdrawing at least a portion of said solvent S1 and/or S2 contained in the synthesis reactor (40) and/or in the separation loop (21).

2. The method as claimed in claim 1, wherein the solvent S1 is identical to the solvent S2.

3. The method as claimed in claim 1, wherein the solvent S1 and/or the solvent S2 are hydrogenated polyalphaolefin solvents or hydrogenated isoparaffinic solvents.

4. The method as claimed in claim 1, further comprising after h):
    i) heating the synthesis reactor (40) to a temperature in the range 150° C. to 270° C.;
    j) increasing the pressure of the synthesis reactor (40) in a manner such as to obtain an absolute pressure in the range 1.0 to 6.0 MPa;
    k) injecting synthesis gas into the bottom of the synthesis reactor (40), replacing the inert gas injected in step e).

5. The method as claimed in claim 1, wherein the separation loop (21) comprises at least one degassing drum (50) and a decanter (60).

6. The method as claimed in claim 5, wherein in h), at least a portion of said solvent S1 and/or S2 is withdrawn via the decanter (60).

7. The method as claimed in claim 5, wherein the level to which the solvent S1 in step b) is filled into the degassing drum (50) and/or into the decanter (60) is at least 10% by volume with respect to the total volume respectively the degassing drum (50) and/or the decanter (60).

8. The method as claimed in claim 1, wherein the inert gas injected in e) is recovered from the head of the synthesis reactor (40), then is recycled to the bottom of said synthesis reactor (40).

9. The method as claimed in claim 1, wherein the catalyst is in the form of particles with a size in the range 10 to 500 micrometres.

10. The method as claimed in claim 1, wherein the quantity of solvent S2 used is determined in a manner such that a concentration of solid of more than 50% by weight in the vessel (30) is not exceeded.

11. The method as claimed in claim 1, wherein the reduction step (20) is carried out in the presence of a reducing gas at a pressure in the range 0 to 1.5 MPa, and at a final reduction temperature in the range 350° C. to 500° C.

12. The method as claimed in claim 1, wherein in d), the synthesis reactor (40) is heated to a temperature of 80° C. or less.

* * * * *